No. 826,236. PATENTED JULY 17, 1906.
W. D. FENNIMORE.
EYEGLASS SPRING AND ATTACHMENT.
APPLICATION FILED JAN. 2, 1906.

Witnesses:
F. E. Maynard

Inventor:
Watson D. Fennimore
By Geo. H. Strong

UNITED STATES PATENT OFFICE.

WATSON D. FENNIMORE, OF SAN FRANCISCO, CALIFORNIA.

EYEGLASS SPRING AND ATTACHMENT.

No. 826,236.      Specification of Letters Patent.      Patented July 17, 1906.

Application filed January 2, 1906. Serial No. 294,168.

*To all whom it may concern:*

Be it known that I, WATSON D. FENNIMORE, a citizen of the United States, residing in the city and county of San Francisco and State of California, have invented new and useful Improvements in Eyeglass Springs and Attachments, of which the following is a specification.

My invention relates to an attachment and connections for eyeglasses and the spring by which the two parts are connected together.

It consists in the combination and arrangement of the parts and in details of construction, which will be more fully explained by reference to the accompanying drawings, in which—

Figure 1:
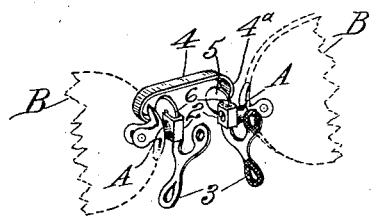
Figure 2:
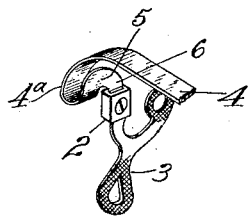

Figure 1 is a perspective view of the improved eyeglass. Fig. 2 is an enlarged view of one end.

In the manufacture of eyeglasses such as are held upon the nose without the use of bows various devices have been employed to connect the two glasses together and to provide a means for firmly holding them upon the nose of the wearer and at the same time to provide an elastic connection between the two parts. Many of these devices are made with connecting-springs having the greater width vertically, so that the glass will be separated outwardly to be applied to the nose; but the majority of users attempt to separate the glasses by opening them from each other and substantially in their normal plane. In order to prevent damage to the spring when this attempt is made, it is necessary to so connect the spring that it lies substantially horizontal or at right angles with the plane of the lenses, and when made in this way the lenses may be opened away from each other substantially in their normal plane, and thus separate the grip or holding portion which fits the nose sufficiently in its application.

My invention consists in an improved construction of the spring and its attachment to the boxes and posts which carry the lenses.

As shown in the drawings, A A are the posts, to which the lenses B, are attached in the usual or any suitable manner.

2 represents boxes on the inner ends of the posts, from the lower portion of which boxes extend the grips 3, which in various forms of construction are designed to clasp opposite sides of the nose of the wearer and to hold the lenses in place. In my invention I employ a spring 4 to connect these boxes and to allow them and the lenses carried thereby to be separated in their normal plane to such a degree that the grips or clasps may be fitted upon the nose, and the tension of the spring will be sufficient to retain the parts in place. In this spring the upper portion is substantially straight, and its plane is at right angles with that of the lenses. The ends 4ª of the spring are carried around into a curve which comprises nearly a full segment. From the inner ends of these curves a portion projects rearwardly, as shown at 5, and is then bent downwardly, as at 6, each of them entering one of the boxes 2, where they are secured in any suitable manner. These plates 5 are of such length as to carry the spring with its curved ends forward of the plane of the lenses to a sufficient distance to clear the bridge of the nose. The special value of this spring lies in the greater length and elasticity obtainable by reason of the segmental curves of the ends and in the rearwardly-extending connections between the inner ends of the spring-segments and the box in which they are secured.

Having thus described my invention, what I claim, and desire to secure by Letters Patent, is—

1. In an eyeglass and in combination with the posts, boxes, and grips thereof, a horizontal bridge having its ends curved downwardly and inwardly whereby they lie substantially directly under the horizontal portion, the extremities of said ends lying in a plane which is substantially at right angles with the plane of the lenses, and said extremities extending rearwardly beyond said curved portions and fitted to said boxes.

2. In an eyeglass and in combination with the lens-holding posts, boxes and grips thereof, a connecting straight flat spring having its width in a plane at right angles with the plane of the lenses, said spring having its ends bent downwardly and thence inwardly and upwardly so that they lie directly under and substantially within the limits of the straight flat portion, said ends thence turned transverse to the bends at the ends of the straight portion and projected rearward beyond the rear edge of the straight portion, and fitted to said boxes.

3. A bridge-piece for eyeglasses said bridge-piece consisting of a piece of spring material adapted to extend straight across between the lenses and having its width transverse to the plane thereof, said piece having its ends turned inwardly under the straight portion and having the extremities of said ends turned substantially at right angles to the bends and projecting rearwardly beyond the rear edge of the main straight portion.

In testimony whereof I have hereunto set my hand in presence of two subscribing witnesses.

WATSON D. FENNIMORE.

Witnesses:
    JNO. W. DAVIS,
    JNO. R. PHELPS.